US010664282B1

(12) United States Patent
Minkin et al.

(10) Patent No.: US 10,664,282 B1
(45) Date of Patent: May 26, 2020

(54) RUNTIME AUGMENTATION OF ENGINE INSTRUCTIONS

(71) Applicant: Amazon Technologies, Inc., Seattle, WA (US)

(72) Inventors: Ilya Minkin, Los Altos, CA (US); Ron Diamant, Albany, CA (US); Mohammad El-Shabani, Austin, TX (US); Dana Michelle Vantrease, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/266,731

(22) Filed: Feb. 4, 2019

(51) Int. Cl.
*G06F 8/60* (2018.01)
*G06F 9/38* (2018.01)
*G06F 9/30* (2018.01)
*G06F 9/52* (2006.01)
*G06F 13/28* (2006.01)
*G06F 9/50* (2006.01)

(52) U.S. Cl.
CPC ........ *G06F 9/3814* (2013.01); *G06F 9/30043* (2013.01); *G06F 9/5027* (2013.01); *G06F 9/52* (2013.01); *G06F 13/28* (2013.01); *G06F 2209/5011* (2013.01)

(58) Field of Classification Search
CPC .. G06F 9/3814; G06F 9/30043; G06F 9/5027; G06F 9/52; G06F 13/28; G06F 2209/5011
See application file for complete search history.

(56) References Cited

U.S. PATENT DOCUMENTS

| | | | |
|---|---|---|---|
| 9,959,227 B1 * | 5/2018 | Diamant | G06F 13/28 |
| 2013/0179505 A1 * | 7/2013 | Cardona | H04L 49/9031 709/204 |
| 2014/0156881 A1 * | 6/2014 | Fujimoto | G06F 3/00 710/22 |
| 2016/0210167 A1 * | 7/2016 | Bolic | G06F 9/45558 |

* cited by examiner

*Primary Examiner* — Brian W Wathen
*Assistant Examiner* — Abdou K Seye
(74) *Attorney, Agent, or Firm* — Kilpatrick Townsend & Stockton LLP

(57) ABSTRACT

Methods for repeated execution of program code by an execution engine are provided. In order to execute large programs, the instruction buffer of an execution engine may be refilled may times with program code to complete one execution of the program. At completion of program execution, the program code needed to begin re-execution of the program is no longer in the instruction buffer. A runtime driver program can load instructions into the instruction buffer, or can cause instructions to be loaded. Once the instructions are loaded, the execution engine may be able to re-execute the instructions without needing further assistance from the runtime driver.

20 Claims, 9 Drawing Sheets

RUNTIME AUGMENTATION OF ENGINE INSTRUCTIONS

BACKGROUND

In a computing system, program code that is going to be executed by, or is being executed by, an integrated circuit device is stored in a memory. The integrated circuit device can read instructions from the memory, store them in an internal register or buffer, then sequentially decode and execute the instructions.

In the computing system, a runtime driver program can manage the operations of the integrated circuit device. For example, the runtime driver program can load instructions into the internal register or buffer, or can cause instructions to be loaded. Once the instructions are loaded, the integrated circuit device may be able to execute the instructions without needing further assistance from the runtime driver.

BRIEF DESCRIPTION OF THE DRAWINGS

Various examples in accordance with the present disclosure will be described with reference to the drawings, in which.

DETAILED DESCRIPTION

Figure 1:
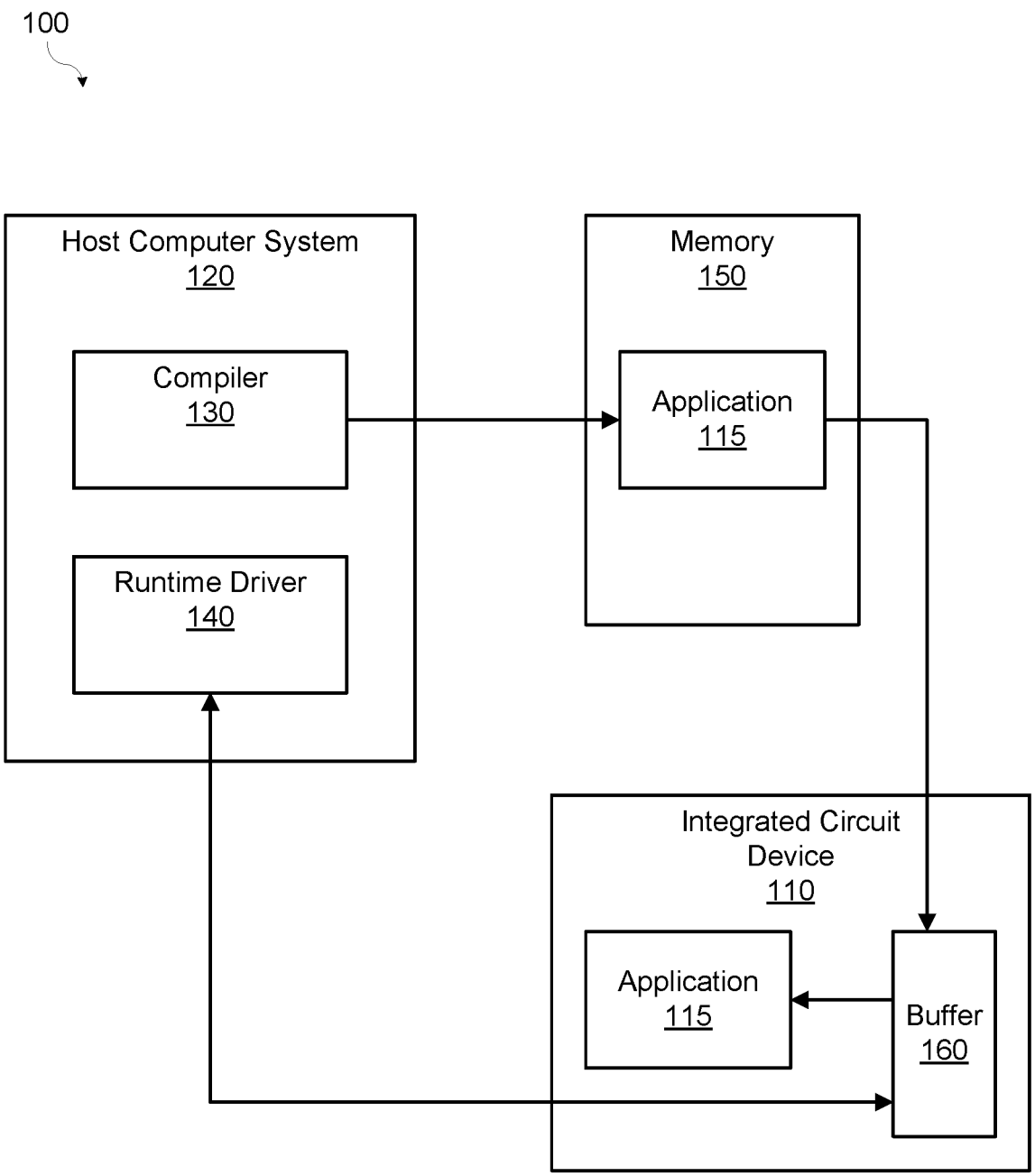
FIG. 1 is a simplified block diagram of an example computing system.

In a computing system, program code that is going to be executed by, or is being executed by, an integrated circuit device is stored in a memory. FIG. 1 is a simplified block diagram of a computing system 100 according to various aspects of the present disclosure. A set of instructions, or code, for each execution engine in an integrated circuit device 110 required to execute an application 115 may be generated by a compiler 130 in a host computer system 120. A runtime driver program 140 may augment the program code while the application is running. In some implementations, the integrated circuit device 110 may be part of the host computer system 120. In other implementations, the integrated circuit device 110 may be separate from the host computer system 120.

Program code that is being executed by or will be executed by the integrated circuit device 110 is stored in a memory 150. The integrated circuit device 110 can read instructions from the memory 150, store them in an internal register or buffer 160, then sequentially decode and execute the instructions. The number of instructions in the program code required to execute a program may be much greater than the available space in the internal register or instruction buffer 160. When the integrated circuit device 110 is to execute the same program more than once, or execute multiple programs, smaller portions of the code for each of these programs must be repeatedly retrieved from the memory and stored in the internal register or instruction buffer 160 of the integrated circuit device 110 for execution. As instructions are executed by the integrated circuit device a refill direct memory access (DMA) queue may cause additional instructions to be copied to the instruction buffer.

Figure 2:
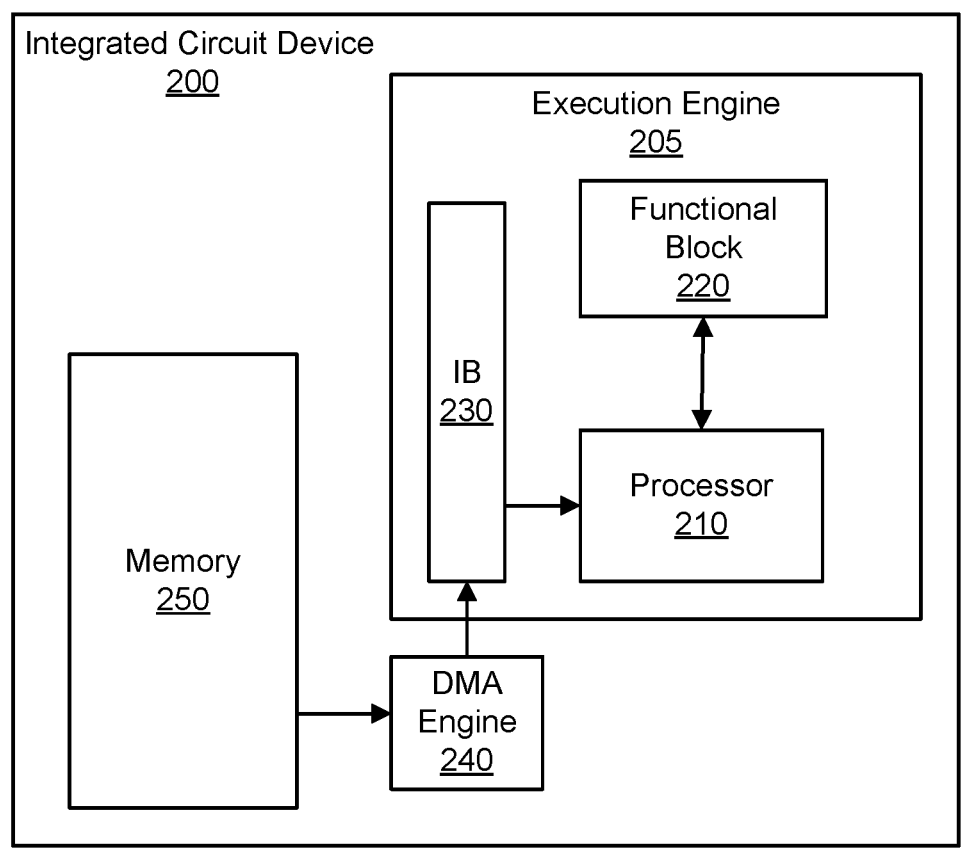
FIG. 2 is a simplified block diagram of an example execution engine.

FIG. 2 is a simplified block diagram of an execution engine according to various aspects of the present disclosure. In various implementations, an execution engine 205 may include a processor 210, a functional block 220, and an instruction buffer 230. The functional block 220 may execute the functions associated with the particular execution engine. The instruction buffer 230 may operate as a first-in, first-out (FIFO) type of memory. Each address in the instruction buffer 230 may be directly addressable. For example, a head pointer and a tail pointer for the instruction buffer 230 can be maintained for a FIFO. The head pointer points to an address in the instruction buffer 230 at a location of a next instruction to execute and the tail pointer points to an address at which additional instructions can be written to the instruction buffer 230.

The processor 210 can read an instruction using the head pointer and then increment the head pointer to the next address. The processor 210 may repeat the read-increment sequence until the head pointer is pointing to the same address as the tail pointer. When the head pointer and tail pointer point to the same address, the processor 210 can stop executing instructions until more instructions are written to the instruction buffer 230. The processor 210 may resume executing instructions once the head pointer no longer points to the same address as the tail pointer.

The hardware instruction buffer 230 may be much smaller than the number of instructions needed to execute an application. A refill DMA engine 240, including a refill DMA queue may be included on the integrated circuit device 200 to fetch instructions from memory 250 and refill the instruction buffer 230 as instructions are executed. By the time execution of the application is complete, it may be that the code needed to start a next execution of the application is no longer in the instruction buffer. DMA transfers therefore should be organized in such a way that the DMA queue that is used to refill the instruction buffer starts refilling the instruction buffer from a first instruction block.

When applications are to be switched, i.e., when a different application is to be executed, execution should be arranged in such a way that there is a known place in the execution flow where once all execution engines reach that place the runtime driver program can switch program code for the execution engines to start executing a different application. The compiler is not suited to control looping or switching of an application, since the compiler would have no visibility into when execution of the current application could stop and a new application could be switched. For example, to execute a neural network, the compiler generates instructions to fetch some data, e.g., weights, for the neural network. The compiler can decide to trigger a DMA transfer for prefetching the data at any point because the compiler manages memory. However, at any given time one of the execution engines may be triggering a DMA transfer or may be about to trigger a DMA transfer. The compiler would not be able to determine whether a DMA transfer is about to be triggered by an execution engine so it is unsafe to switch models.

The runtime driver program in the host computer system may augment the program instructions generated by the compiler. For example, the compiler may produce code for one complete execution (or one batch executions) of an application program. The runtime driver program may generate additional instructions that provide the ability to continuously submit new execution requests for the application program as the requests arrive (limited by the depth of the request queue).

Preamble and postamble instruction blocks may also be generated by the runtime driver program. As used herein, the preamble instruction block is a set of instructions loaded into the instruction buffer of an execution engine in front of compiler generated code for an application program, to be executed before the code for an application program. As used herein, the postamble instruction block is a set of instructions loaded into the instruction buffer of an execution engine after the compiler generated code for the application program, to be executed after the code for an application program.

The preamble and postamble instruction blocks generated by the runtime driver program may provide the ability to repeatedly execute an application as well as to switch from one application to another by determining that all execution engines have reached a "safe to switch" state. The preamble and postamble instruction blocks may also determine when an application execution request is completed and all execution engines are in "safe to switch" state.

As application execution requests are received, the requests may be added to the input queue of the integrated circuit device, and when the integrated circuit device completes the previous execution of the application it loops around to begin the next execution of the application. However, runtime driver program execution and execution of the application program may be largely independent of each other. To avoid explicit signaling between the runtime driver program and the integrated circuit device a counting semaphore may be used. When an application execution request is added to the queue the semaphore is incremented. For example, when a burst of three requests is received, the runtime driver program would add the three requests to the queue and increment the semaphore three times. The execution engine may then execute the application three times without further instructions from the runtime driver program to tell the execution engine when to loop. The runtime driver program may decrement the semaphore each time the execution engine notifies the runtime driver program that an execution of the application is complete.

The first instruction, e.g., instruction "0," in the preamble instruction block may be an instruction to notify the runtime driver program that execution of an application has completed. The notification may enable the runtime driver program to keep track of the number of submitted requests to execute an application versus the number of times application execution has completed. The runtime driver program may decrement the semaphore each time a notification from the execution engine is received. The second instruction may block an execution engine from executing the application until the semaphore indicates that application execution request data becomes available. When the semaphore is not equal to zero, the next instruction in the preamble block may trigger the refill DMA ring to refill the instruction buffer with the compiler generated code of the application program.

The runtime driver program may insert an instruction after the last instruction in the application program code to trigger the refill DMA queue to load the postamble instruction block. The instructions in the postamble block may bring the execution engine to an initial state. For example, the head and tail pointers of the refill DMA queue may not be pointing to the beginning of the ring since the ring has been executing memory transfers. Also the head and tail pointers of the instruction buffer may not be pointing to the beginning of the buffer.

The postamble instruction block may include an instruction to reset the head and tail pointers of the refill DMA queue to enable triggering of memory transfers from the ring again. The next instruction in the postamble instruction block may trigger the refill DMA queue to execute descriptors to reset the head and tail pointers of the instruction buffer and to load the preamble instruction block into the instruction buffer of the execution engine.

In accordance with various aspects of the present disclosure, the runtime driver program in the host computer system may also create DMA descriptors in the refill DMA queue for loading instructions at the beginning of the application program code (e.g., the preamble instruction block) and at the end of the application program code (e.g., the postamble instruction block) into the instruction buffer of the execution engine. DMA descriptors are instructions to move data from a first location to a second location.

The DMA descriptors in the refill DMA queue may cause the instruction in the preamble instruction block to be loaded into the instruction buffer starting at address "0." For various reasons, for example, but not limited to, debugging, instruction "0" should be placed at offset zero in the instruction buffer to ensure that every application starts at the same place. One of the DMA descriptors created by the runtime driver program may trigger a reset of the instruction buffer such that the program counter goes to zero (e.g., the head and tail pointers of the instruction buffer point to address "0") and the instruction buffer refill begins at address "0."

The runtime driver program may set up DMA rings in such a way that the instructions in the instruction buffer get refilled. A DMA ring may be a block of memory, for example, in the host computer system, containing a list of descriptors describing memory transactions. When the descriptor list reaches its final descriptor, the DMA returns to the base address of the list creating a descriptor ring. A DMA ring may be attached to a DMA engine (e.g., a hardware engine that takes a pointer to the block of memory that contains all the descriptors and also the head and the tail pointers) in order to execute the memory transactions described in the ring. Any number of rings can be stored inactive in memory. To perform various operations, a DMA ring can be attached to a DMA engine/queue to trigger the transactions from that queue.

In the description herein, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Figure 3A:
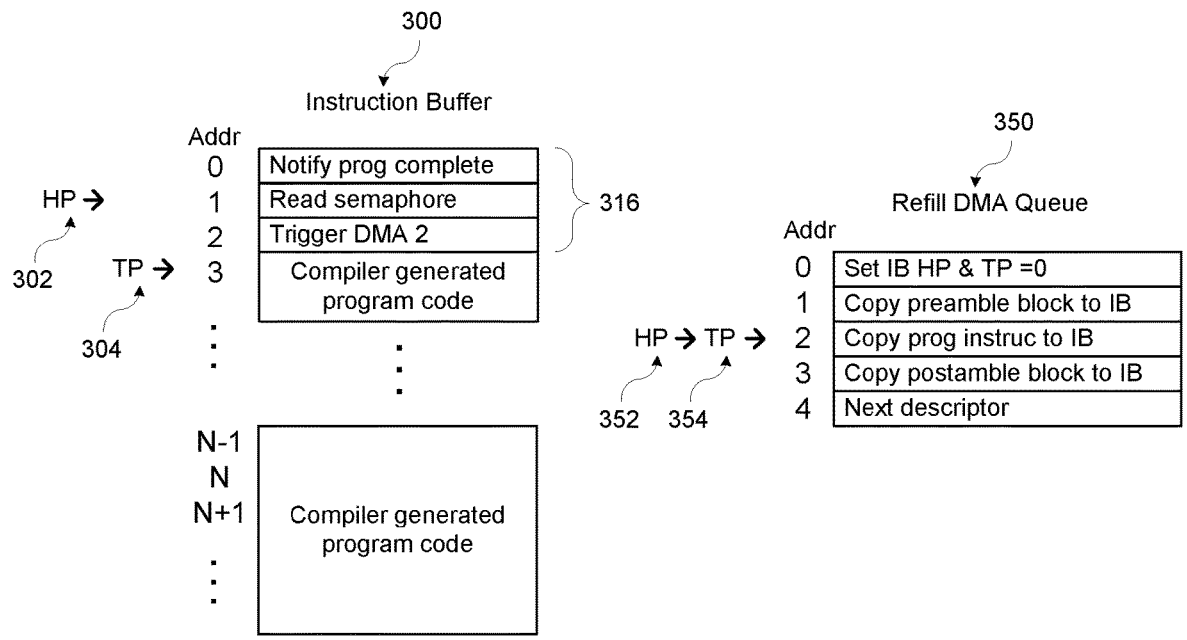
FIGS. 3A-3F are diagrams illustrating an example of the operation of the instruction buffer and the refill DMA queue.

FIGS. 3A-3F are diagrams illustrating the operation of the instruction buffer 300 and the refill DMA queue 350 according to various aspects of the present disclosure. Referring to FIG. 3A, the runtime driver program may cause the head pointer 352 and the tail pointer 354 of the refill DMA queue 350 to be set to address "0" and may cause a set of DMA descriptors (i.e., instructions) to be loaded into the refill DMA queue 350 starting at address "0." The runtime driver program may trigger the descriptor at address "0" of the refill DMA queue 350 to reset the head pointer 302 and the tail pointer 304 of the instruction buffer (IB) 300 of the first execution engine to address "0" (e.g., the beginning of the instruction buffer (IB) 300). The runtime driver program may further trigger the descriptor at address "1" of the refill DMA queue 350 to cause a first set of instructions 316 (e.g., a preamble instruction block) generated by the runtime driver program to be loaded into the instruction buffer (IB) 300 of the first execution engine starting at address "0." When the first set of instructions is loaded into the IB 300, the tail pointer 304 of the instruction buffer may be incremented to address "3" (i.e., the next available address to load instructions) causing the first execution engine to begin executing instructions.

Figure 3B:
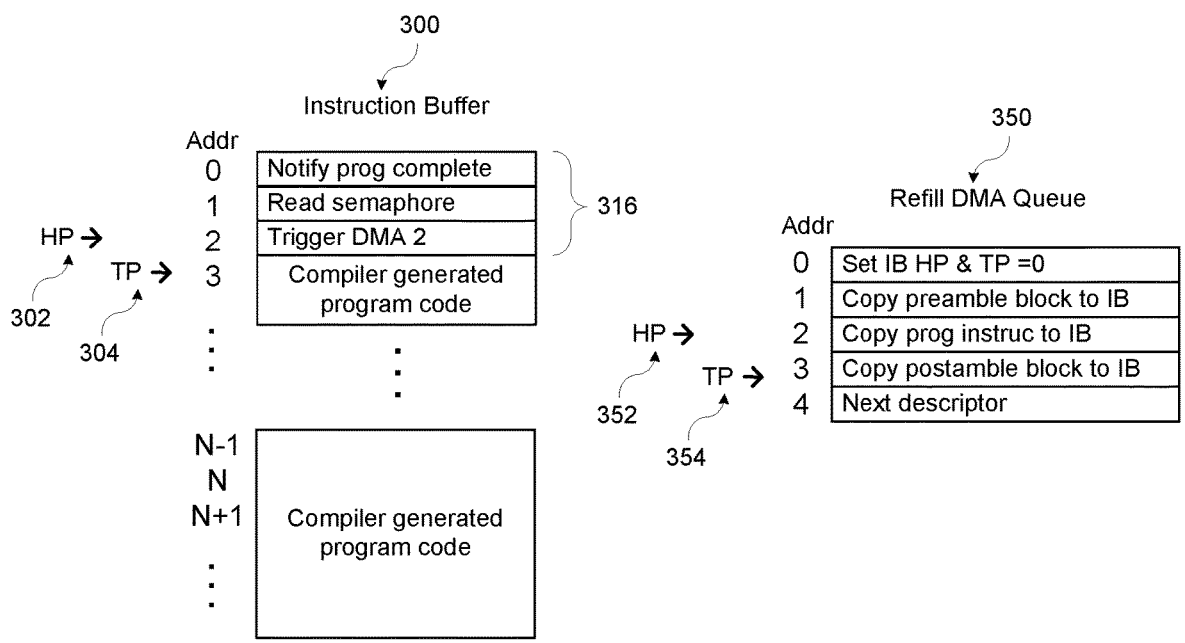

A first instruction in the first set of instructions 316 executed by the execution engine may be a notification instruction to cause the execution engine to notify the runtime driver program of the host computer system that execution of an application program by the first execution engine has completed. A second instruction in the first set of instructions 316 may cause the first execution engine to read a semaphore value. The semaphore value may be set by the runtime driver program and may indicate a number of times the application program is to be executed by the first execution engine. When the execution engine receives the indication that an application is to be executed, execution of the instructions in the IB 300 may resume. Referring to FIG. 3B, when the first execution engine resumes executing instructions, the third instruction in the first set of instructions 316 may trigger the descriptor at address "2" of the refill DMA queue causing compiler generated application program code to be loaded into the IB 300 of the first execution engine.

Figure 3C:
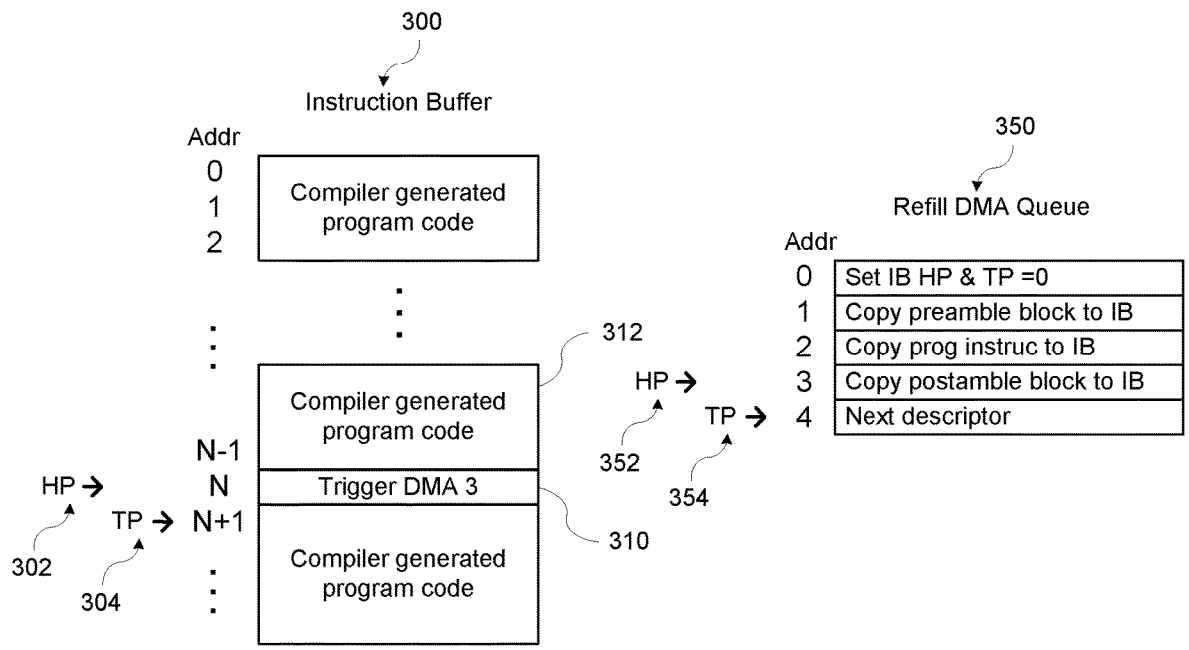

Referring to FIG. 3C, the execution engine may execute the application program. The runtime driver program of the host computer system may insert a memory instruction 310 as a last instruction after the compiler generated code 312 for the application. The head pointer 302 of the instruction buffer (IB) 300 may point to an address (i.e., N) of an instruction to be executed and the tail pointer 304 of the IB 300 may point to an address (i.e., N+1) at which new instructions may begin to be loaded. When the execution engine executes the instruction 310 at address N in the IB 300, the DMA descriptor at address "3" in the refill DMA queue 350 may be triggered. In some implementations a barrier may be generated to cause all execution engines in the integrated circuit to reach the same point in their execution.

Figure 3D:
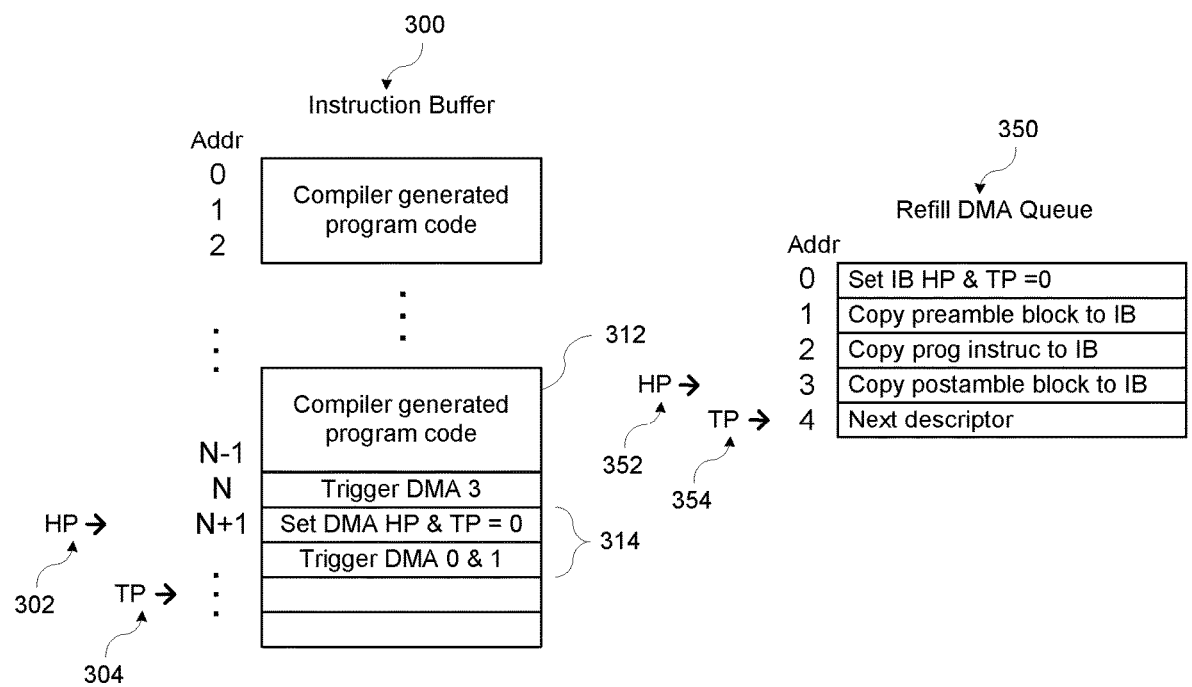

Referring to FIG. 3D, when the refill DMA descriptor at address "3" in the refill DMA queue is triggered, a second set of instructions 314 (e.g., a postamble instruction block) may be loaded into the IB 300 of the first execution engine starting at the address pointed to by the tail pointer 304 of the IB 300 (i.e., address N+1) and the tail pointer 304 may be incremented to the next available address causing the execution engine to resume executing the instructions.

Figure 3E:
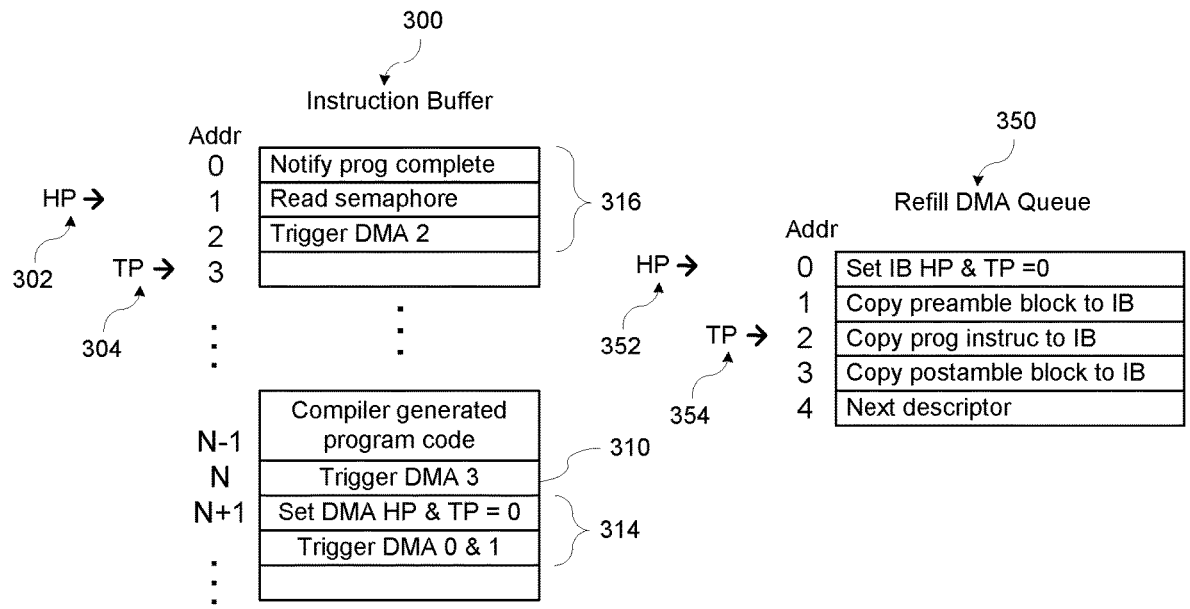

Referring to FIG. 3E, execution of the second set of instructions may cause the head pointer 352 and tail pointer 354 of the refill DMA queue 350 to be reset to address "0" and the DMA descriptors at addresses "0" and "1" may be triggered. Execution of the DMA descriptor at address "0" may cause the head pointer 302 and tail pointer 304 of the IB 300 of the first execution engine to be reset to address "0." Execution of the DMA descriptor at address "1" may again cause the first set of instructions 316 (e.g., the preamble instruction block) to be loaded into the IB 300 of the first execution engine starting at the address pointed to by the tail pointer 304 of the IB 300 (i.e., address "0") and the tail pointer 304 may be incremented to the next available address (i.e., address "3") causing the execution engine to resume executing the instructions.

The first instruction executed in the first set of instructions 316 is the notification instruction to cause the execution engine to notify the runtime driver program of the host computer system that execution of the application has completed. In some cases, the host computer system may receive requests to continue executing the current application. When the execution requests are received, the runtime driver program may update the request queue for the execution engine and increment a counting semaphore. The second instruction in the first set of instructions 316 may cause the execution engine to read the semaphore. The semaphore may be set, incremented, or decremented by the runtime driver program of the host computer system when a number of remaining times the current application is to be executed is greater than one.

When the execution engine receives the indication that the current application is to be executed again, execution of the instructions in the IB 300 may resume. In cases where the current application will not be executed again, for example when the number of completed application execution notifications equals the number of requested executions, notification to the runtime driver program that execution of the current application is complete may cause the runtime driver program to load a different application.

Figure 3F:
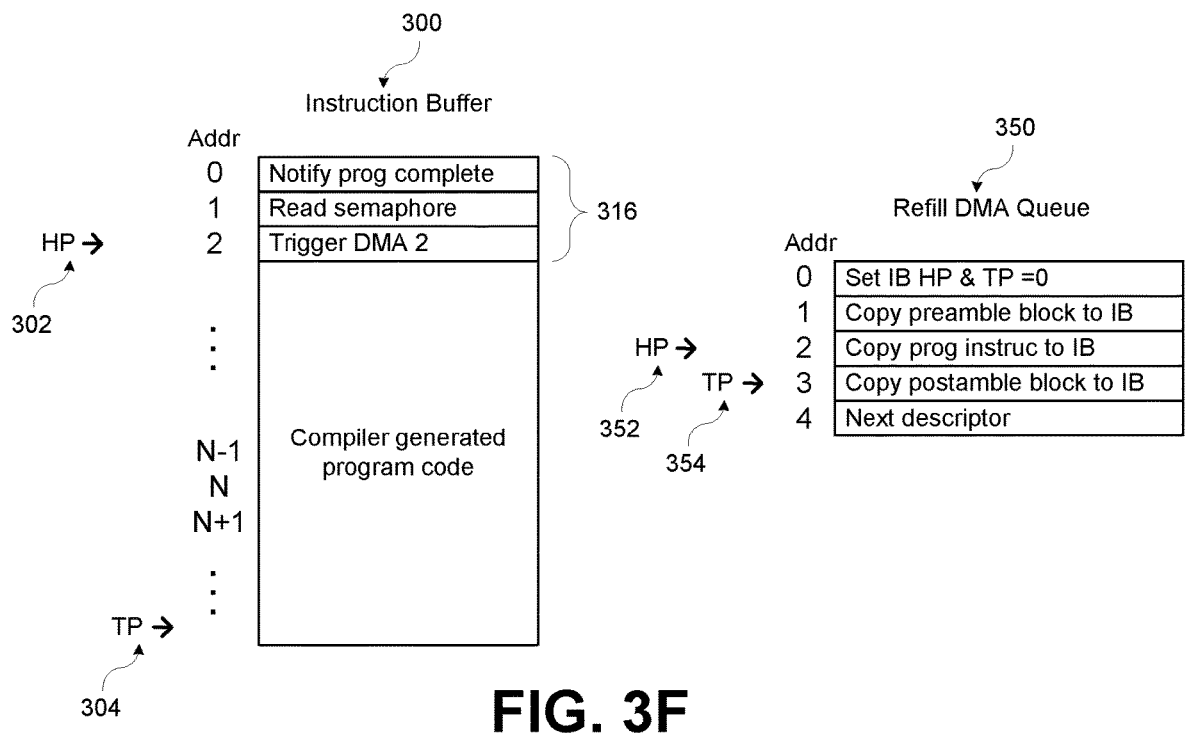

Referring to FIG. 3F, when the runtime driver program sets, increments, or decrements the semaphore, the next instruction executed by the execution engine may trigger the DMA descriptor at address "2." Triggering the DMA descriptor at address "2" may cause the refill DMA engine to reload the program code for the current application beginning at the address pointed to by the tail pointer 304 of the IB 300. The tail pointer 304 of the IB 300 may be incremented to the next available address causing the execution engine to begin executing the program code for the application.

The refill DMA ring may trigger the DMA rings for the application to cause the DMA rings to refill the instruction buffer with the application program code. Each application program may have a plurality of associated DMA rings. For example, a neural network model may have one DMA ring for each execution engine needed to run the model: one DMA ring for executing memory transactions for the neural network weights, one DMA ring for the weights, one DMA ring for the input queue, and one DMA ring for the output queue, and the DMA rings may be swapped when switching between, for example, image identification and machine translation. One of ordinary skill in the art will appreciate that an application program may have a different number of associated DMA rings.

Figure 4:
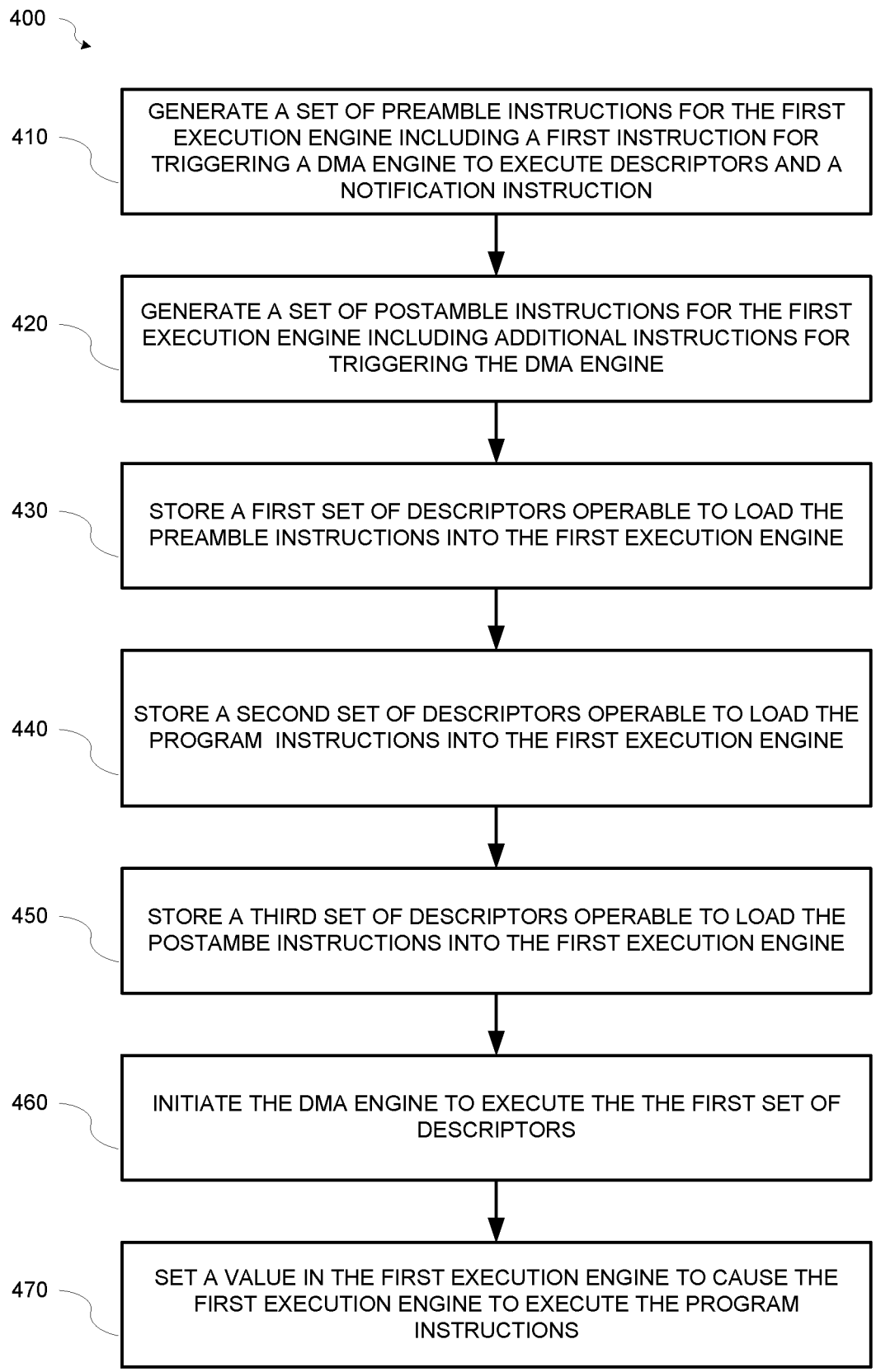
FIG. 4 is a flowchart illustrating an example of a method for runtime augmentation of execution engine instructions.

FIG. 4 is a flowchart illustrating a method 400 for runtime augmentation of execution engine instructions. Referring to FIG. 4, at block 410 a runtime driver program may generate a preamble instruction block (e.g., a first set of instructions) for a first execution engine. The preamble instruction block may be inserted in front of the application program code generated by the compiler and may include a first instruction for triggering a DMA engine. The DMA engine may execute descriptors and a notification instruction. The notification instruction may communicate a completed execution state of application program code to the runtime driver program.

Execution of the notification instructions may cause the first execution engine to notify the runtime driver program that execution of an application has completed. In some cases, execution requests for the current application may be received. At block 420, the runtime driver program may generate a postamble instruction block (e.g., a second set of instructions) for the first execution engine, the postamble instruction block including additional instructions for triggering the DMA engine. The postamble instruction block may be inserted after the application program code generated by the compiler.

At block 430, the runtime driver program may cause a first set of descriptors to be stored in a block of memory of the host computer system. The first set of descriptors may be operable to load the preamble instruction block into the first execution engine.

At block 440, the runtime driver program may cause a second set of descriptors to be stored in the block of memory. The second set of descriptors may be operable to load the program instructions into the first execution engine.

At block 450, the runtime driver program may cause a third set of descriptors to be stored in the block of memory. The third set of descriptors may be operable to load the postamble instruction block into the first execution engine.

At block 460, the runtime driver program may cause the DMA engine to execute the first set of descriptors. The first set of descriptors may reset head and tail pointers of the instruction buffer of the first execution engine and cause the preamble instruction block to be loaded into the first execution engine. At block 470, the runtime driver program may cause a value, for example a semaphore, to be set in the first execution engine. Setting of the value may cause the first execution engine to execute the program instructions.

It should be appreciated that the specific operations illustrated in FIG. 4 provide a particular method for runtime augmentation of execution engine instructions according to an implementation. Other sequences of operations may also be performed according to alternative implementations. For example, alternative implementations may perform the operations outlined above in a different order. Moreover, the individual operations illustrated in FIG. 4 may include multiple sub-steps that may be performed in various sequences as appropriate to the individual operations. Furthermore, additional operations may be added or removed depending on the particular applications. One of ordinary skill in the art would recognize many variations, modifications, and alternatives.

In accordance with various aspects of the present disclosure, the refill DMA ring may trigger the DMA rings for the application to cause the DMA rings to refill the instruction buffer with the application program code. Different application programs, for example, different neural network models, may have a plurality of associated DMA rings. Application switching involves swapping a set of DMA rings used for one application program to a set of DMA rings used for a different application program. The runtime augmentation methods described above can provide a known "safe" state of the execution engines and DMA queues to switch application programs. For example, waiting for the semaphore in the first set of instructions, in addition to providing a known point for repeated execution of a current application program, provides a safe state to switch application programs.

The semaphore is generated by the runtime driver program and is incremented based on received application execution requests. The runtime driver program compares completed executions of the application program to the semaphore indicating the number of required executions to determine when the execution engine will complete the executions. Applications should not be switched (e.g., DMA rings should not be swapped) while an execution engine is operating or while a DMA transaction is in process or could be triggered. When the execution engine is blocking on the semaphore, the execution engine is in a quiescent state, and no DMA transactions are in process or can be triggered. Thus, blocking on semaphore provides a known safe place during execution to swap DMA rings for different application programs.

The runtime driver program may determine that the execution engine is blocking on the semaphore by comparing the number of submitted application execution requests with the semaphore count. Each time the execution engine completes an execution of the application, a first instruction in the second set of instructions (e.g., the preamble instruction block) notifies the runtime driver program that execution is complete. When the number of notified application executions is equal to the number of application execution requests in the queue, the execution engine will block on the wait instruction in the second set of instructions and the execution engine will be in a safe state for the runtime driver program to switch applications.

Each execution engine in the integrated circuit device may have a refill DMA engine assigned to it. The runtime driver program may wait for explicit notifications from each execution engine. The preamble instruction block (i.e., the second set of instructions) generated by the runtime causes the same instructions to be inserted at the beginning of every set of application program code generated by the compiler. In particular, at least one instruction in the preamble instruction block (i.e., the second set of instructions) triggers the program code refill from whichever DMA ring is attached to the DMA queue. Thus, if a DMA ring for a new application program is attached to the DMA queue, the program code for that application program will be loaded in the instruction buffer when the at least one instruction is executed.

When switching to a new application program the head and the tail pointers of the refill DMA queue must be adjusted to begin execution of the actual application program code generated by the compiler. Referring to FIG. 3D, an instruction in the first set of instructions may set head and tail pointers of the refill DMA queue to the address of an instruction to load the application program code since the previous descriptors (i.e., to reset the IB head and tail pointers and load the preamble instruction block) were executed at the completion of the previous execution of the program code.

While various aspects of the examples have been described with respect to the operation of one execution engine, the descriptions of one execution engine are provided for clarity and ease of explanation. The integrated circuit device in accordance with the present disclosure may include a plurality of execution engines. One of ordinary skill in the art will appreciate that the descriptions provided herein apply equally to each of the plurality execution engines that may be included in the integrated circuit device.

Figure 5:
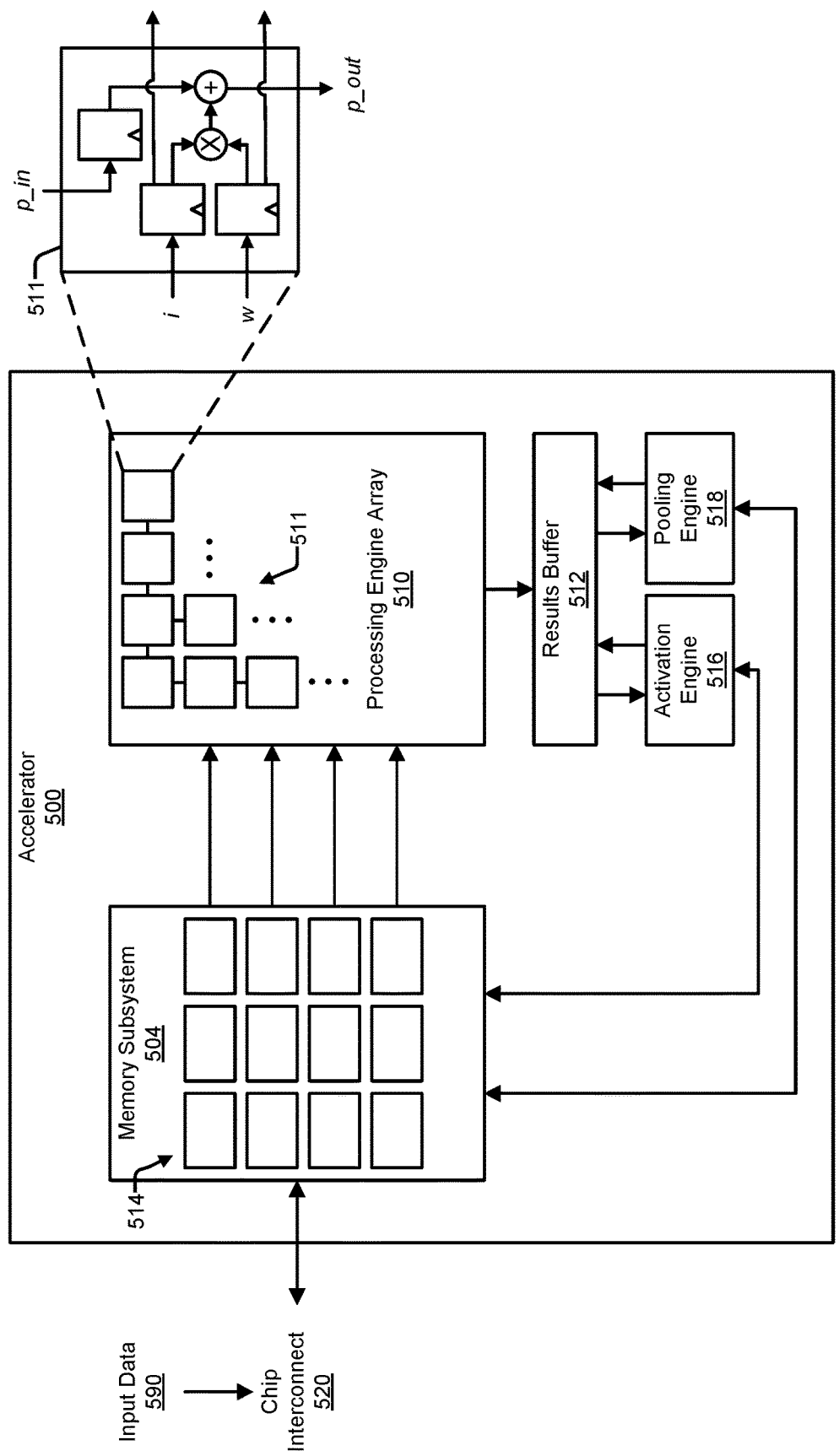
FIG. 5 is a block diagram illustrating an example of an integrated circuit device that includes multiple execution engines.

FIG. 5 is a block diagram illustrating an example of an integrated circuit device that includes multiple execution engines that can have data inter-dependencies. The example of FIG. 5 illustrates an accelerator engine 500. In various examples, the accelerator engine 500, for a set of input data (e.g., input data 590), can execute computations using a processing engine array 510, an activation block 516, and/or a pooling block 518. In some examples, the example accelerator engine 500 may be an integrated circuit component of a processor, such as a neural network processor. The processor may have other integrated circuit components, including additional accelerator engines.

In various implementations, the memory subsystem 504 can include multiple memory banks 514. In these implementations, each memory bank 514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 504 can permit simultaneous access to the read or write channels of multiple memory banks. As another example, the memory subsystem 504 can include arbitration logic such that arbitration between, for example, the outputs of multiple memory banks 514 can result in more than one memory bank's output being used. In these and other examples, though globally managed by the memory subsystem 504, each memory bank can be operated independently of any other.

Having the memory banks 514 be independently accessible can increase the efficiency of the accelerator 500. For example, values can be simultaneously read and provided to each row of the processing engine array 510, so that the entire processing engine array 510 can be in use in one clock cycle. As another example, the memory banks 514 can be read at the same time that results computed by the processing engine array 510 are written to the memory subsystem 504. In contrast, a single memory may be able to service only one read or write at a time. With a single memory, multiple clock cycles can be required, for example, to read input data for each row of the processing engine array 510 before the processing engine array 510 can be started.

In various implementations, the memory subsystem 504 can be configured to simultaneously service multiple clients, including the processing engine array 510, the activation engine 516, the pooling engine 518, and any external clients that access the memory subsystem 504 over a communication fabric 520. In some implementations, being able to service multiple clients can mean that the memory subsystem 504 has at least as many memory banks as there are clients. In some cases, each row of the processing engine array 510 can count as a separate client. In some cases, each column of the processing engine array 510 can output a result, such that each column can count as a separate write client. In some cases, output from the processing engine array 510 can be written into the memory banks 514 that can then subsequently provide input data for the processing engine array 510. As another example, the activation engine 516 and the pooling engine 518 can include multiple execution channels, each of which can be separate memory clients. The memory banks 514 can be implemented, for example, using static random access memory (SRAM).

In various implementations, the memory subsystem 504 can include control logic. The control logic can, for example, keep track of the address spaces of each of the memory banks 514, identify memory banks 514 to read from or write to, and/or move data between the memory banks 514. In some implementations, memory banks 514 can be hardwired to particular clients. For example, a set of memory banks 514 can be hardwired to provide values to the rows of the processing engine array 510, with one memory bank servicing each row. As another example, a set of memory banks can be hired wired to receive values from columns of the processing engine array 510, with one memory bank receiving data for each column.

The processing engine array 510 is the computation matrix of the example accelerator 500. The processing engine array 510 can, for example, execute parallel integration, convolution, correlation, and/or matrix multiplication, among other things. The processing engine array 510 includes multiple processing engines 511, arranged in rows and columns, such that results output by one processing engine 511 can be input directly into another processing engine 511. Processing engines 511 that are not on the outside edges of the processing engine array 510 thus can receive data to operate on from other processing engines 511, rather than from the memory subsystem 504.

In various examples, the processing engine array 510 uses systolic execution, in which data arrives at each processing engine 511 from different directions at regular intervals. In some examples, input data can flow into the processing engine array 510 from the left and weight values can be loaded at the top. In some examples weights and input data can flow from the left and partial sums can flow from top to bottom. In these and other examples, a multiply-and-accumulate operation moves through the processing engine array 510 as a diagonal wave front, with data moving to the right and down across the array. Control signals can be input at the left at the same time as weights, and can flow across and down along with the computation.

In various implementations, the number of columns in the processing engine array 510 determines the computational capacity of the processing engine array 510, and the number of rows determines the required memory bandwidth for achieving maximum utilization of the processing engine array 510. The processing engine array 510 can have, for example, 64 columns and 428 rows, or some other number of columns and rows.

An example of a processing engine 511 is illustrated in FIG. 5 in an inset diagram. As illustrated by this example, a processing engine 511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 511.

In the illustrated example, an input from above can include a partial sum, pin, provided either from another processing engine 511 or from a previous round of computation by the processing engine array 510. When starting a computation for a new set of input data, the top row of the processing engine array 510 can receive a fixed value for p_in, such as zero. As illustrated by this example, i and w are multiplied together and the result is summed with p_in to produce a new partial sum, p_out, which can be input into another processing engine 511. Various other implementations of the processing engine 511 are possible.

Outputs from the last row in the processing engine array 510 can be temporarily stored in the results buffer 512. The results can be intermediate results, which can be written to the memory banks 514 to be provided to the processing engine array 510 for additional computation. Alternatively, the results can be final results, which, once written to the memory banks 514 can be read from the memory subsystem 504 over the communication fabric 520, to be output by the system.

In some implementations, the accelerator 500 includes an activation engine 516. In these implementations, the activation engine 516 can combine the results from the processing engine array 510 into one or more output activations. For example, for a convolutional neural network, convolutions from multiple channels can be summed to produce an output activation for a single channel. In other examples, accumulating results from one or more columns in the processing engine array 510 may be needed to produce an output activation for a single node in the neural network. In some examples, activation engine 516 can be bypassed.

In various examples, the activation engine 516 can include multiple separate execution channels. In these examples, the execution channels can correspond to the columns of the processing engine array 510, and can perform an operation on the outputs of a column, the result of which can be stored in the memory subsystem 504. In these examples, the activation engine 516 may be able to perform between 1 and n parallel computations, where n is equal to the number of columns in the processing engine array 510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 500 can include a pooling engine 518.

Pooling is the combining of outputs of the columns of the processing engine array 510. Combining can include for example, computing a maximum value, a minimum value, an average value, a median value, a summation, a multiplication, or another logical or mathematical combination. In various examples, the pooling engine 518 can include multiple execution channels that can operating on values from corresponding columns of the processing engine array 510. In these examples, the pooling engine 518 may be able to perform between 1 and n parallel computations, where n is equal to the number of columns in the processing engine array 510. In various examples, execution channels of the pooling engine 518 can operate in parallel and/or simultaneously. In some examples, the pooling engine 518 can be bypassed.

Herein, the activation engine 516 and the pooling engine 518 may be referred to collectively as execution engines. The processing engine array 510 is another example of an execution engine. Another example of an execution engine is a Direct Memory Access (DMA) engine, which may be located outside the accelerator 500.

Input data 590 can arrive over the communication fabric 520. The communication fabric 520 can connect the accelerator 500 to other components of a processor, such as a DMA engine that can obtain input data 590 from an Input/Output (I/O) device, a storage drive, or a network interface. The input data 590 can be, for example one-dimensional data, such as a character string or numerical sequence, or two-dimensional data, such as an array of pixel values for an image or frequency and amplitude values over time for an audio signal. In some examples, the input data 590 can be three-dimensional, as may be the case with, for example, the situational information used by a self-driving car or virtual reality data. In some implementations, the memory subsystem 504 can include a separate buffer for the input data 590.

In some implementations, the input data 590 can be stored in the memory banks 514 when the accelerator 500 receives the input data 590.

In some examples, the accelerator 500 can implement a neural network processing engine. In these examples, the accelerator 500, for a set of input data 590, can execute a neural network to perform a task for which the neural network was trained. Executing a neural network on a set of input data can be referred to as inference or performing inference.

The weights for the neural network can be stored in the memory subsystem 504, along with input data 590 on which the neural network will operate. The neural network can also include instructions, which can program the processing engine array 510 to perform various computations on the weights and the input data. The instructions can also be stored in the memory subsystem 504, in the memory banks 514 or in a separate instruction buffer. The processing engine array 510 can output intermediate results, which represent the outputs of individual layers of the neural network. In some cases, the activation engine 516 and/or pooling engine 518 may be enabled for computations called for by certain layers of the neural network. The accelerator 500 can store the intermediate results in the memory subsystem 504 for inputting into the processing engine array 510 to compute results for the next layer of the neural network. The processing engine array 510 can further output final results from a last layer of the neural network. The final results can be stored in the memory subsystem 504 and then be copied out to host processor memory or to another location.

Figure 6:
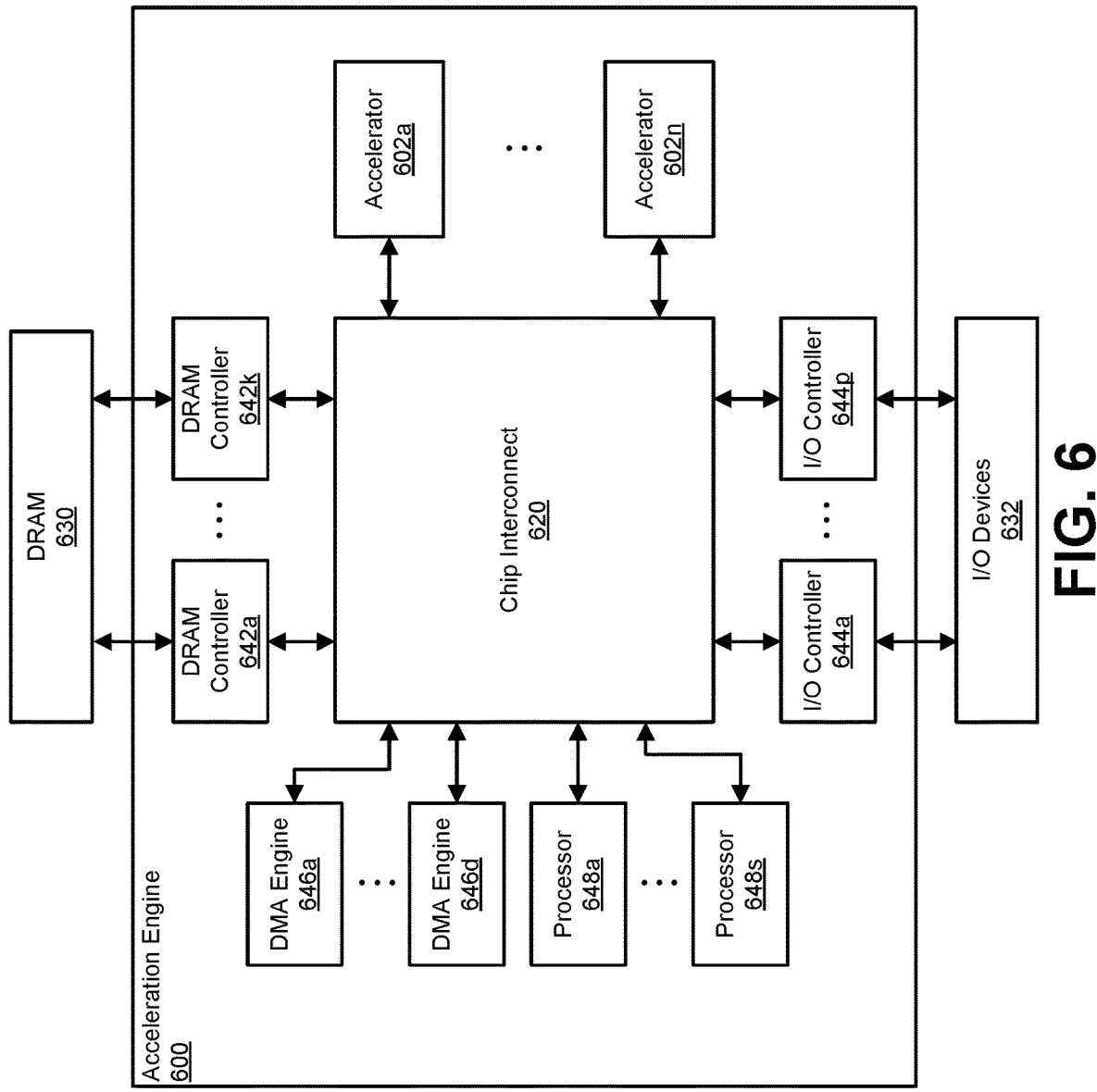
FIG. 6 includes a block diagram that illustrates an example of an acceleration engine.

FIG. 6 includes a block diagram that illustrates an example of an acceleration engine 600. The acceleration engine 600 is an example of an integrated circuit that can include one or more accelerators 602a-602n that may be similar to the accelerator illustrated in FIG. 5.

In the example of FIG. 6, the acceleration engine 600 includes multiple accelerators 602a-602n, each of which can perform a set of operations. In various examples, the accelerators 602a-602n for particular types of operations, so that the accelerators 602a-602n can perform the operations much faster than when similar operations are performed by a general purpose processor. In various examples, to perform a set of operations, input data on which the operations are to be performed must first be moved into the accelerators 602a-602n. Additionally, in some cases, program code is also moved into the accelerators 602a-602n, which programs the operations that the accelerators 602a-602n will perform on the data. In the illustrated example, the acceleration engine 600 includes n accelerators 602a-602n. Examples of accelerators that can be included in the acceleration engine 600 include graphics accelerators, floating point accelerators, neural network accelerators, and others. In various examples, the accelerators 602a-602n can each be the same (e.g., each of the is a graphics accelerator) or can be different (e.g., the accelerators 602a-602n include a graphics accelerator, a floating point accelerator, and neural network accelerator).

The example acceleration engine 600 further includes DRAM controllers 642a-642k for communicating with an external memory. The external memory is implemented, in this example, using DRAM 630. In the illustrated example, the acceleration engine 600 includes k DRAM controllers 642a-642k, each of which may be able to communicate with an independent set of banks of DRAM. In other examples, other types of RAM technology can be used for the external memory. The DRAM controllers 642a-642k can also be referred to as memory controllers.

In various examples, input data and/or program code for the accelerators 602a-602n can be stored in the DRAM 630. Different programs can cause the accelerators 602a-602n to perform different operations. For example, when one of the accelerators is a neural network accelerator, one program can configure the neural network accelerator to perform speech recognition while another program can configure the neural network accelerator to perform image recognition. In various examples, different accelerators 602a-602n can be programmed with different programs, so that each performs a different set of operations. In various examples, the processors 648a-648s can manage moving of program code from the DRAM 630 to the accelerators 602a-602n.

The example acceleration engine 600 further includes I/O controllers 644a-644p for communicating with I/O devices 632 in the system. The acceleration engine 600 can communicate with I/O devices over, for example, a processor bus. In some examples, the processor bus can be implemented using Peripheral Component Interconnect (PCI) and/or a variation of the PCI bus protocol. The processor bus can connect the acceleration engine 600 to I/O devices such as, for example, input and output devices, memory controllers, storage devices, and/or network interface cards, among other things. In some examples, the I/O controllers 644-644p can enable the acceleration engine 600 to act as an I/O device for a host processor. For example, the acceleration engine 600 can be the recipient of input data from the host processor, and a command indicating an operation to be performed on the input data (e.g., a particular computation or analysis). In the illustrated example, the acceleration engine 600 includes p I/O controllers 644a-644p, each of which may include a separate root complex and may communicate with a separate set of I/O devices 632. In other examples, other standardized bus protocols, such as Ultra Path Interconnect (UPI) can be used for the host bus. In other examples, a proprietary bus protocol can be used.

Movement of data in the acceleration engine 600 can be managed by one or more processors 648a-648s, which can also be referred to as data management processors. In the example of FIG. 6, the acceleration engine 600 includes s processors 648a-648s incorporated into (e.g., on the same silicon die) the device. In other examples, the processors 648a-648s can be external to the acceleration engine 600 (e.g., on a different die and/or in a different package). In some examples, the processors 648a-648s can manage the movement of data from I/O devices 632 to the accelerators 602a-602n or the DRAM 630. For example, input data may be located at an I/O device 632 or in processor memory, and the processors 648a-648s can move the input from the I/O device 632 or processor memory into an accelerator or into DRAM 630. As another example, program code for the accelerators 602a-602n may be located on an I/O device 632 or in processor memory.

The example acceleration engine 600 further includes DMA engines 646a-646d that can move data between the accelerators 602a-602n, DRAM controllers 642a-642k, and I/O controllers 644a-644p. In the illustrated example, the acceleration engine 600 includes d DMA engines 646a-646d. In some implementations, the DMA engines 646a-646d can be assigned to specific tasks, such as moving data from the DRAM controllers 642a-642d to the accelerators 602a-602n, or moving data between the I/O controllers 644a-644p and the accelerators 602a-602n. These tasks can be assigned, for example, by enqueueing descriptors with the DMA engines 646a-646d, where a descriptor identifies an address for a block of data and an operation (e.g., a read or a write) to perform. A descriptor, for example, can direct a DMA engine to instruct a DMA controller to read a block of data from DRAM 630. A descriptor can, as a further example, instruct the DMA engine to write data, read by the DMA controller, to an accelerator. Further descriptors can be used to move data from an accelerator to DRAM 630.

In various examples, each of the processors 648a-648s can be responsible for managing the data movement for a different accelerator. In some examples, a processor may manage the data movement for more than one accelerator. Similarly, in various examples, each of the processors 648a-648s can be assigned to one or more DMA engines 646a-646d. In these and other examples, associations between processors 648a-648s, accelerators 602a-602n, and DMA engines 646a-646d is determined by program code being executed by each respective processor.

In the example acceleration engine 600, the various components can communicate over a chip interconnect 620. The chip interconnect 620 primarily includes wiring for routing data between the components of the acceleration engine 600. In some cases, the chip interconnect 620 can include a minimal amount of logic, such as multiplexors to control the direction of data, flip-flops for handling clock domain crossings, and timing logic.

Figure 7:
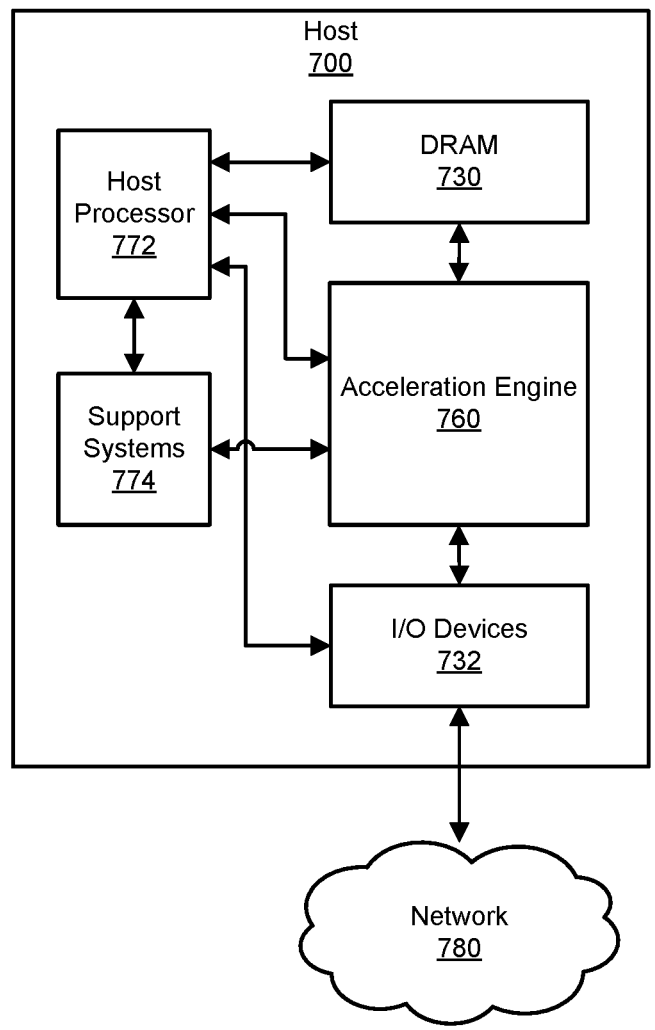
FIG. 7 includes a block diagram that illustrates an example of a host system in which an integrated circuit can be used.

FIG. 7 includes a block diagram that illustrates an example of a host system 700 in which an acceleration engine 760 can be used. The acceleration engine 760 of FIG. 7 is an example of a device that can include one or more accelerator engines such as is illustrated in FIG. 6. The example host system 770 of FIG. 7 includes the acceleration engine 760, a host processor 772, DRAM 730 or processor memory, I/O devices 732, and support systems 774. In various implementations, the host system 770 can include other hardware that is not illustrated here.

The host processor 772 is a general purpose integrated circuit that is capable of executing program instructions. In some examples, the host processor 772 can include multiple processing cores. A multi-core processor may include multiple processing units within the same processor In some examples, the host system 770 can include more than one host processor 772. In some examples, the host processor 772 and the acceleration engine 760 can be one chip, such as, one or more integrated circuits within the same package.

In various examples, the host processor 772 can communicate with other components in the host system 770 over one or more communication channels. For the example, the host system 770 can include a host processor bus, which the host processor 772 can use to communicate with the DRAM 730, for example. As another example, the host system 770 can include an I/O bus, such as a PCI-based bus, over which the host processor 772 can communicate with the acceleration engine 760 and/or the I/O devices 732, for example. In various examples, the host system 770 can, alternatively or additionally, include other communication channels or busses, such as serial busses, power management busses, storage device busses, and so on.

In some examples, software programs executing on the host processor 772 can receive or generate input for processing by the acceleration engine 760. In some examples, the programs can select an appropriate neural network to execute for a given input. For example, a program may be for language translation, and can select one or more neural networks capable of speech recognition and/or machine translation. In these and other examples, the programs can configure the acceleration engine 760 with the neural network to execute, and/or can select a neural network processing engine on the acceleration engine 760 that has previously been configured to execute the desired neural network. In some examples, once the acceleration engine 760 has started inference on input data, the host processor 772 can manage the movement of data (such as weights, instructions, intermediate results, results of conditional layers, and/or final results) into or out of the acceleration engine 760.

In some examples, a software program that is using the acceleration engine 760 to conduct inference can read the result from a conditional layer from the acceleration engine 760 and/or from a storage location, such as in DRAM 730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 730 is memory that is used by the host processor 772 for storage of program code that the host processor 772 is in the process of executing, as well as values that are being operated on. In some examples, the data for a neural network (e.g., weight values, instructions, and other data) can be all or partially stored in the DRAM 730. DRAM is a common term for processor memory, and though DRAM is volatile memory, processor memory can be volatile and/or non-volatile. Though not illustrated here, the host system 770 can include other volatile and non-volatile memories for other purposes. For example, the host system 770 can include a Read-Only Memory (ROM) that stores boot code for booting the host system 770 at power on, and/or Basic Input/Output System (BIOS) code.

Though not illustrated here, the DRAM 730 can store instructions for various programs, which can be loaded into and be executed by the host processor 772. For example, the DRAM 730 can be storing instructions for an operating system, one or more data stores, one or more application programs, one or more drivers, and/or services for implementing the features disclosed herein.

The operating system can manage and orchestrate the overall operation of the host system 770, such as scheduling tasks, executing applications, and/or controller peripheral devices, among other operations. In some examples, a host system 770 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 770. For example, some drivers can provide communication between the operating system and peripheral devices or I/O devices 732. Alternatively or additionally, some drivers may provide communication between application programs and the operating system, and/or application programs and peripheral devices accessible to the host system 770. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 732 can include hardware for connecting to user input and output devices, such as keyboards, mice, pens, tablets, voice input devices, touch input devices, displays or monitors, speakers, and printers, among other devices The I/O devices 732 can also include storage drives and/or network interfaces for connecting to a network 780. For example, the host system 770 can use a network interface to communicate with storage devices, user terminals, other computing devices or servers, and/or other networks, among various examples.

In various examples, one or more of the I/O devices 732 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 770 or may be in an external enclosure. A storage device can be fixed (e.g., attached by screws) or removable (e.g., having a physical release mechanism and possibly a hot-plug mechanism).

Storage devices, the DRAM 730, and any other memory component in the host system 770 are examples of computer-readable storage media. Computer-readable storage media are physical mediums that are capable of storing data in a format that can be read by a device such as the host processor 772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 732 can be PCI-based devices. In these examples, a PCI-based I/O device includes a PCI interface for communicating with the host system 770. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 774 can include hardware for coordinating the operations of the acceleration engine 760. For example, the support systems 774 can include a microprocessor that coordinates the activities of the acceleration engine 760, including moving data around on the acceleration engine 760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 772. In some examples, the program executed by the microprocessor is stored on the hardware of microprocessor, or on a non-volatile memory chip in the host system 770. In some examples, the microprocessor and the acceleration engine 760 can be on chip, such as one integrated circuit on the same die and in the same package.

In some examples, the support systems 774 can be responsible for taking instructions from the host processor 772 when programs executing on the host processor 772 request the execution of a neural network. For example, the host processor 772 can provide the support systems 774 with a set of input data and a task that is to be performed on the set of input data. In this example, the support systems 774 can identify a neural network that can perform the task, and can program the acceleration engine 760 to execute the neural network on the set of input data. In some examples, the support systems 774 only needs to select an appropriate neural network processing engine of the neural network processor. In some examples, the support systems 774 may need to load the data for the neural network onto the acceleration engine 760 before the acceleration engine 760 can start executing the neural network. In these and other examples, the support systems 774 can further receive the output of executing the neural network, and provide the output back to the host processor 772.

In some examples, the operations of the support systems 774 can be handled by the host processor 772. In these examples, the support systems 774 may not be needed and can be omitted from the host system 770.

In various examples, the host system 700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for causing an integrated circuit device to repeat execution of an application or execute a different application, the method comprising:

generating, by a driver program, a set of preamble instructions for a first execution engine of the integrated circuit device, the set of preamble instructions to be inserted in front of program code for an application generated by a compiler, wherein the first execution engine is operable to cause a direct memory access (DMA) engine to trigger a set of first descriptors stored in a block of memory of a host computer system;

generating, by the driver program, a set of postamble instructions to be inserted in after the program code for the application, wherein the first execution engine is operable to cause the DMA engine to trigger a set of second descriptors stored in the block of memory of the host computer system;

wherein the set of preamble instructions further causes the driver program to:

receive, from the first execution engine, a notification of a completed execution state of the first execution engine;

update a counter to maintain a count of a required number of executions of the application based on the notification;

determine whether the count of the required number executions is equal to a number of execution requests for the application;

in response to determining that the count is not equal to the number of execution requests, cause the first execution engine to cause the DMA engine to trigger a set of third descriptors to refill an instruction buffer of the first execution engine with the program code for the application; and in response to determining that the count is equal to the number of execution requests, cause the first execution engine to cause the DMA engine to trigger the set of third descriptors to refill the instruction buffer with program code for a different application.

2. The method of claim 1, further comprising:

incrementing, by the driver program, the counter based on a number of application execution requests in a request queue, and when the number of application execution requests in the request queue is greater than a number of completed execution states communicated to the driver program by the first execution engine, causing the DMA engine to refill the instruction buffer of the first execution engine with the program code for the application that completed execution.

3. The method of claim 1, further comprising:
incrementing, by the driver program, the counter based on a number of application execution requests in a request queue, and
when the number of application execution requests in the request queue is not greater than a number of completed execution states communicated to the driver program by the first execution engine, causing the DMA engine to refill the instruction buffer of the first execution engine with program code for a different application than the application that completed execution.

4. The method of claim 1, wherein the first execution engine is a computation engine executing a pooling operation, a computation engine executing an activation function, an array of processing engines, or a DMA engine.

5. A computer-implemented method, comprising:
receiving input corresponding to a request to execute an application on an integrated circuit device, the application comprising a set of program instructions stored in a memory of a host computer system, wherein the application is to be executed on a first execution engine of the integrated circuit device;
generating a first set of instructions for the first execution engine, the first set of instructions including a first instruction for generating a notification and a second instruction for triggering a second execution engine operable to execute descriptors;
generating a second set of instructions for the first execution engine, the second set of instructions including additional instructions for triggering the second execution engine;
storing a first set of descriptors in a block of memory of the host computer system, wherein when executed, the first set of descriptors load the first set of instructions into the first execution engine;
storing a second set of descriptors in the block of memory, wherein when executed, the second set of descriptors load the set of program instructions into the first execution engine;
storing a third set of descriptors in the block of memory, wherein when executed, the third set of descriptors load the second set of instructions into the first execution engine;
initiating the second execution engine to execute the first set of descriptors; and
setting a value in the first execution engine, wherein the setting of the value causes the first execution engine to execute the set of program instructions.

6. The computer-implemented method of claim 5, further comprising inserting an instruction generated by a driver program after a last operation of the application, the instruction operable to trigger the set of first descriptors to load the first set of instructions.

7. The computer-implemented method of claim 6, further comprising loading the first set of instructions into an instruction buffer of the first execution engine after the instruction generated by the driver program.

8. The computer-implemented method of claim 5, wherein the set of first descriptors are operable to reset head and tail pointers of an instruction buffer to address zero, and instructions from the first set of instructions are loaded into the instruction buffer starting at address zero.

9. The computer-implemented method of claim 5, further comprising incrementing a counter by a driver program when an application execution request is received in a request queue.

10. The computer-implemented method of claim 9, further comprising refilling an instruction buffer with program code of an application that completed execution when a number of notifications received by the driver program is not equal to the value of the counter.

11. The computer-implemented method of claim 9, further comprising:
refilling an instruction buffer with program code of a different application when a number of notifications received by the driver program is equal to the value of the counter.

12. The computer-implemented method of claim 11, wherein the refilling the instruction buffer with program code of a different application comprises swapping first blocks of memory that store descriptors associated with a previously executed application with second blocks of memory that store descriptors for a different program to be executed, and
refilling the instruction buffer with application program code for the application to be executed using the descriptors stored in the second blocks of memory.

13. The computer-implemented method of claim 5, wherein when a value of a counter is equal to a number of executions of the application, a driver program determines that the first execution engine is in a quiescent state, and no memory transfers are in process.

14. The computer-implemented method of claim 5, wherein the second set of instructions includes an instruction to cause a head pointer and a tail pointer of the block of memory storing the first, second, and third sets of descriptors to be reset to an address of a first descriptor in the first set of descriptors.

15. The computer-implemented method of claim 14, wherein based on a value of a counter corresponding to a number of execution requests, executing the second set of descriptors causes program code for the application that completed execution to be reloaded and executed again by the first execution engine or causes program code for a different application to be loaded and executed by the first execution engine.

16. The computer-implemented method of claim 14, wherein the integrated circuit device comprises a neural network processor.

17. A non-transitory computer-readable medium including instructions that, when executed by a processor, cause a driver program to perform operations including:
receiving input corresponding to a request to execute an application on an integrated circuit device, the application comprising a set of program instructions stored in a memory of a host computer system, wherein the application is to be executed on a first execution engine of the integrated circuit device;
generating a first set of instructions for the first execution engine, the first set of instructions including a first instruction for generating a notification and a second instruction for triggering a second execution engine operable to execute descriptors;
generating a second set of instructions for the first execution engine, the second set of instructions including additional instructions for triggering the second execution engine;
storing a first set of descriptors in a block of memory of the host computer system, wherein when executed, the first set of descriptors load the first set of instructions into the first execution engine;

storing a second set of descriptors in the block of memory, wherein when executed, the second set of descriptors load the set of program instructions into the first execution engine;

storing a third set of descriptors in the block of memory, wherein, when executed, the third set of descriptors load the second set of instructions into the first execution engine;

initiating the second execution engine to execute the first set of descriptors; and setting a value in the first execution engine, wherein the setting of the value causes the first execution engine to execute the set of program instructions.

18. The non-transitory computer-readable medium of claim 17, further including instructions that, when executed by the processor, cause the driver program to perform operations including:

receiving, at a request queue, application execution requests;

incrementing a counting semaphore according to a number of application execution requests received; and providing the counting semaphore to the first execution engine indicating a number of application executions to be performed by the first execution engine.

19. The non-transitory computer-readable medium of claim 17, further including instructions that, when executed by the processor, cause the driver program to perform operations including:

receiving the notification of a completion state of the first execution engine when the first execution engine completes execution of the application;

comparing a number of notifications with a number of application execution requests received; and in response to determining that the number of application execution requests is greater than the number of notifications, repeating execution of the application.

20. The non-transitory computer-readable medium of claim 19, further including instructions that, when executed by the processor, cause the driver program to perform operations including:

when the value of a counter is equal to a number of executions of the application, determining that the first execution engine is in a quiescent state, and no memory transfers are in process.

* * * * *